US012576973B1

(12) United States Patent
Roychoudhury et al.

(10) Patent No.: US 12,576,973 B1
(45) Date of Patent: Mar. 17, 2026

(54) DESTRUCTIVE ADSORBER VIA A CATALYTIC-SCRUBBER FOR ONBOARD PILOT BREATHING AIR FILTERING AND MONITORING

(71) Applicant: Precision Combustion, Inc., North Haven, CT (US)

(72) Inventors: Subir Roychoudhury, Madison, CT (US); Christian Junaedi, Cheshire, CT (US); Sam Whiteley, New Haven, CT (US)

(73) Assignee: Precision Combustion, Inc., North Haven, CT (US)

( * ) Notice: Subject to any disclaimer, the term of this patent is extended or adjusted under 35 U.S.C. 154(b) by 910 days.

(21) Appl. No.: 17/739,030

(22) Filed: May 6, 2022

Related U.S. Application Data

(60) Provisional application No. 63/186,864, filed on May 11, 2021.

(51) Int. Cl.
    *B64D 13/06*     (2006.01)

(52) U.S. Cl.
    CPC ...... *B64D 13/06* (2013.01); *B64D 2013/0618* (2013.01); *B64D 2013/0651* (2013.01); *B64D 2013/0677* (2013.01)

(58) Field of Classification Search
    CPC ................ A61L 2/00–28; B64D 13/06; B64D 2013/0618; B64D 2013/0651; B64D 2013/0677
    See application file for complete search history.

(56) References Cited

U.S. PATENT DOCUMENTS

| | | | |
|---|---|---|---|
| 5,051,241 | A | 9/1991 | Pfefferle |
| 6,156,444 | A | 12/2000 | Smith |
| 6,746,657 | B2 | 6/2004 | Castaldi |
| 7,141,092 | B1 | 11/2006 | Roychoudhury |
| 7,504,047 | B2 | 3/2009 | Castaldi |
| 8,337,757 | B2 | 12/2012 | Roychoudhury |
| 8,439,990 | B2 | 5/2013 | Roychoudhury |
| 8,710,106 | B2 | 4/2014 | Junaedi |
| 8,739,550 | B2 | 6/2014 | Etemad |
| 8,784,515 | B2 | 7/2014 | Roychoudhury |

(Continued)

FOREIGN PATENT DOCUMENTS

| | | | | |
|---|---|---|---|---|
| CN | 110655037 | B | * 11/2020 | |
| WO | WO-0107118 | A1 | * 2/2001 | ............. B01D 53/02 |

OTHER PUBLICATIONS

K. Bull, "Cabin Air Filtration: Helping to Protect Occupants From Infectious Diseases," Elsevier (2007) 142-144.

(Continued)

*Primary Examiner* — Jill A Warden
(74) *Attorney, Agent, or Firm* — Andrew D. Gathy

(57) ABSTRACT

A decontamination system for removing bleed air contamination comprising an enclosure defining a cavity; an inlet fluidly coupled to the cavity, the inlet configured to receive air into the cavity; an outlet fluidly coupled to the cavity, the outlet configured to discharge the air from the cavity; a bed located within the cavity fluidly coupled to the inlet and the outlet; the bed comprising a substrate with decontamination materials attached to the substrate; and a compressor bleed air system fluidly coupled to the inlet and an on-board oxygen generation system fluidly coupled to the outlet.

11 Claims, 3 Drawing Sheets

(56)     References Cited

U.S. PATENT DOCUMENTS

| | | | |
|---|---|---|---|
| 9,199,846 B2 * | 12/2015 | Roychoudhury | ...... B01D 53/48 |
| 10,060,344 B1 | 8/2018 | Roychoudhury | |
| 10,411,281 B1 | 9/2019 | Vilekar | |
| 10,464,044 B1 * | 11/2019 | Zoican-Loebick | ......................... |
| | | | B01J 20/28064 |
| 10,787,959 B2 | 9/2020 | Roychoudhury | |
| 10,994,241 B1 | 5/2021 | Junaedi | |
| 11,285,463 B1 | 3/2022 | Loebick | |
| 2022/0111350 A1 | 4/2022 | Weissman et al. | |

OTHER PUBLICATIONS

Co-Pending unpublished non-provisional patent application, U.S. Appl. No. 17/695,320, filed Mar. 15, 2022, entitled "System for Dehumidification of a Vehicle Interior," Applicant: Precision Combustion, Inc.
Co-Pending unpublished non-provisional patent application, U.S. Appl. No. 17/695,272, filed Mar. 15, 2022, entitled "System for Decontamination of a Vehicle Interior," Applicant: Precision Combustion, Inc.
Co-Pending unpublished non-provisional patent application, U.S. Appl. No. 17/015,796, filed Sep. 9, 2020, entitled "Regenerable Adsorbent System," Applicant: Precision Combustion, Inc.

* cited by examiner

100

Install decontamination system — 110

Flow air through catalyst bed — 112

Oxidize contaminants — 114

Capture compounds — 116

Monitor bed condition — 118

Replace bed — 120

DESTRUCTIVE ADSORBER VIA A CATALYTIC-SCRUBBER FOR ONBOARD PILOT BREATHING AIR FILTERING AND MONITORING

CROSS-REFERENCE TO RELATED APPLICATIONS

This application claims benefit of U.S. provisional application No. 63/186,864 filed on May 11, 2021.

GOVERNMENT RIGHTS

The invention was made with support from the United States Government under Contract no. N68335-19-C-0063, sponsored by the U. S. Navy. The government has certain rights in this invention.

FIELD OF THE INVENTION

The present disclosure is directed to a gas turbine engine bleed air decontamination system and process.

The breathing air supplied to a pilot on-board a military aircraft is sourced from the jet engine compressor, and is then processed by the On-Board Oxygen Generation System (OBOGS) which concentrates oxygen from the incoming air to a necessary level for the pilot to breath at high altitudes. With the source of air so close to the mechanical workings of the compressor, it is possible for contaminants to enter the air. The air is prone to contain contaminants from the engine and the hydraulic oils, or complex pyrolyzed mixtures thereof. Contamination events can overwhelm the OBOGS system, and could enter the pilot's breathing air leading to unsafe conditions.

Incidents have occurred in which Navy F/A-18 pilots experienced symptoms of hypoxia, disorientation, and headache, which could be attributed to the presence of contaminants in the breathing air. However, this has yet to be verified due to the technology gap that exists in the ability for real-time monitoring of pre- and post-OBOGS-provided pilot air supply.

What is needed is a system configured to monitor the pilot breathing air, to keep track of the contamination events, and to destroy and/or remove the contaminants, so that the pilot can receive clean breathing air.

SUMMARY

In accordance with the present disclosure, there is provided a decontamination system for removing bleed air contamination comprising an enclosure defining a cavity; an inlet fluidly coupled to the cavity, the inlet configured to receive air into the cavity; an outlet fluidly coupled to the cavity, the outlet configured to discharge the air from the cavity; a bed located within the cavity fluidly coupled to the inlet and the outlet; the bed comprising a substrate with decontamination materials attached to the substrate; and a compressor bleed air system fluidly coupled to the inlet and an on-board oxygen generation system fluidly coupled to the outlet.

A further embodiment of any of the foregoing embodiments may additionally and/or alternatively include the decontamination materials are configured to remove the contaminants from the bleed air.

A further embodiment of any of the foregoing embodiments may additionally and/or alternatively include the decontamination materials comprise catalyst materials configured to oxidize the contaminants in the bleed air.

A further embodiment of any of the foregoing embodiments may additionally and/or alternatively include the substrate comprises at least one of a mesh, a foam and a nano fiber support and combinations thereof.

A further embodiment of any of the foregoing embodiments may additionally and/or alternatively include the decontamination system further comprising sorbent materials coupled to the substrate, the sorbent materials coated with functionalities that adsorb the contaminants.

A further embodiment of any of the foregoing embodiments may additionally and/or alternatively include the substrate comprises an ultra-short-channel-length metal substrate.

A further embodiment of any of the foregoing embodiments may additionally and/or alternatively include the decontamination system further comprising a heater fluidly coupled to the substrate configured to heat the substrate to a predetermined temperature configured to react with contaminants in the bleed air.

In accordance with the present disclosure, there is provided a gas turbine engine equipped with a compressor bleed air decontamination system comprising a bleed air supply line; an enclosure defining a cavity; an inlet fluidly coupled to the cavity, the inlet configured to receive bleed air into the cavity from a compressor bleed air supply pipe; an outlet fluidly coupled to the cavity, the outlet configured to discharge the air from the cavity into the bleed air supply pipe coupled to an on-board oxygen generator system; a bed located within the cavity fluidly coupled to the inlet and the outlet; the bed comprising a substrate with decontamination material attached to the substrate.

A further embodiment of any of the foregoing embodiments may additionally and/or alternatively include the decontamination materials comprise catalyst materials configured to oxidize the contaminants in the bleed air.

A further embodiment of any of the foregoing embodiments may additionally and/or alternatively include substrate comprises layers of at least one of a mesh, a foam and a nano fiber support and combinations thereof.

A further embodiment of any of the foregoing embodiments may additionally and/or alternatively include. the gas turbine engine equipped with a compressor bleed air decontamination system further comprising at least one sensor fluidly coupled to the bed, the at least one sensor configured to monitor the bed.

A further embodiment of any of the foregoing embodiments may additionally and/or alternatively include the substrate comprises an ultra-short-channel-length metal substrate.

A further embodiment of any of the foregoing embodiments may additionally and/or alternatively include the gas turbine engine equipped with a compressor bleed air decontamination system further comprising at least one of a heater fluidly coupled to the substrate, the substrate resistively heated, and a mesh resistively heated configured to heat the substrate to a predetermined temperature configured to oxidize contaminants in the bleed air.

In accordance with the present disclosure, there is provided a process for decontamination of a compressor bleed air system comprising fluidly coupling the decontamination system to the compressor bleed air system, the decontamination system comprising an enclosure defining a cavity; an inlet fluidly coupled to the cavity, the inlet configured to receive compressor bleed air into the cavity; an outlet fluidly coupled to the cavity, the outlet configured to discharge the compressor bleed air from the cavity into an on-board oxygen generator system supply pipe; a bed located within the cavity fluidly coupled to the inlet and the outlet; the bed comprising a substrate with decontamination material attached to the substrate; and flowing the compressor bleed air through the bed; contacting the compressor bleed air to the decontamination material; oxidizing contaminants contained in the compressor bleed air; capturing the contaminants on the bed; and discharging the compressor bleed air from the outlet into the on-board oxygen generator system supply pipe.

A further embodiment of any of the foregoing embodiments may additionally and/or alternatively include the decontamination materials comprise catalyst materials configured to oxidize the contaminants in the compressor bleed air.

A further embodiment of any of the foregoing embodiments may additionally and/or alternatively include the substrate comprises at least one of a mesh, a foam and a nano fiber support and combinations thereof.

A further embodiment of any of the foregoing embodiments may additionally and/or alternatively include the substrate comprises an ultra-short-channel-length metal substrate.

A further embodiment of any of the foregoing embodiments may additionally and/or alternatively include the process further comprising monitoring a condition of the bed responsive to inputs from at least one sensor fluidly coupled to the bed.

A further embodiment of any of the foregoing embodiments may additionally and/or alternatively include the process further comprising replacing the bed responsive to the condition of the bed.

A further embodiment of any of the foregoing embodiments may additionally and/or alternatively include the condition is selected from the group consisting of a predetermined carbon dioxide level in the compressor bleed air, a predetermined temperature difference between the inlet and the outlet; a predetermined carbon monoxide level in the compressor bleed air and a presence of organo-phosphates in the compressor bleed air.

Other details of the air decontamination system and process are set forth in the following detailed description and the accompanying drawings wherein like reference numerals depict like elements.

DETAILED DESCRIPTION

Figure 1:
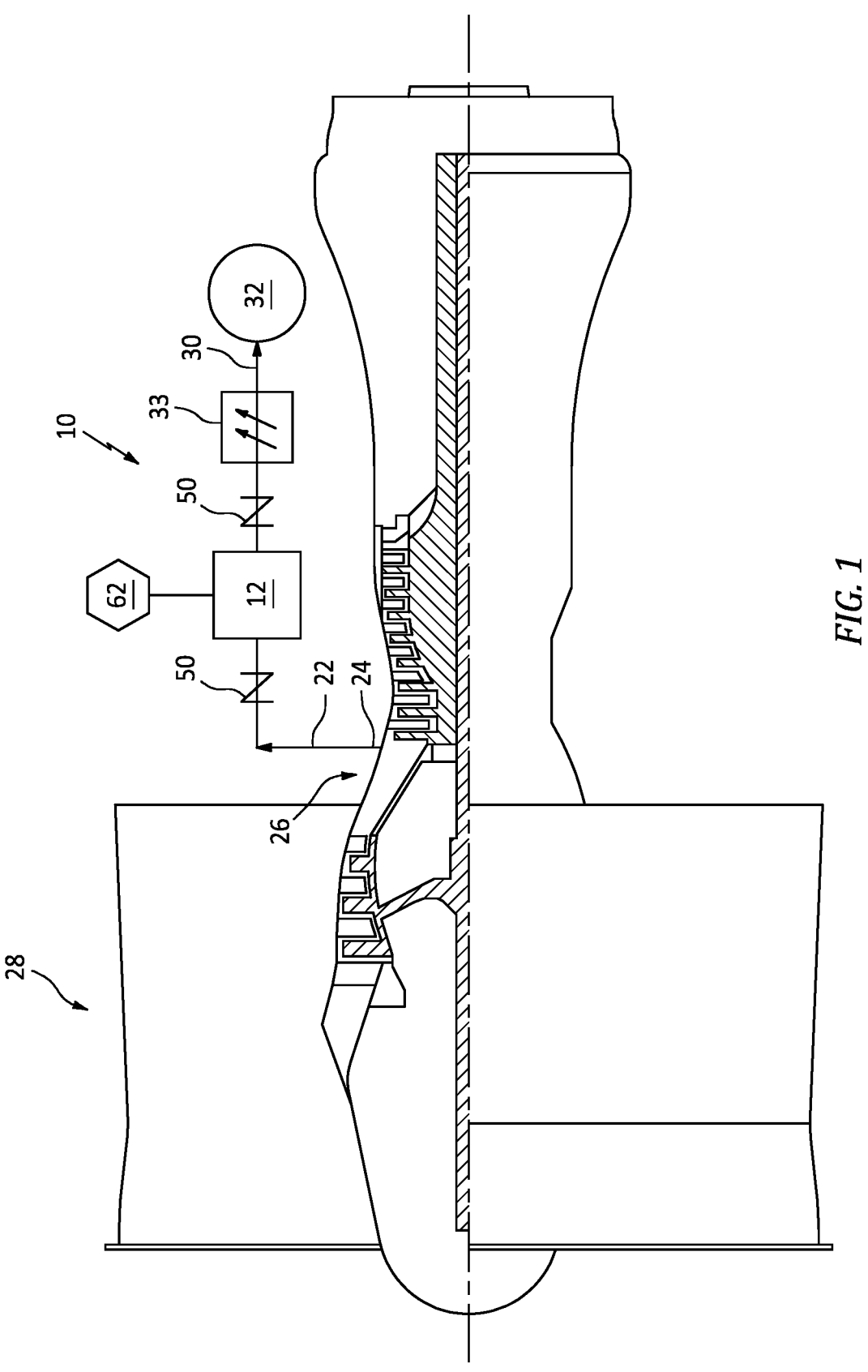
FIG. 1 is an exemplary gas turbine engine equipped with an exemplary decontamination system.
Figure 2:
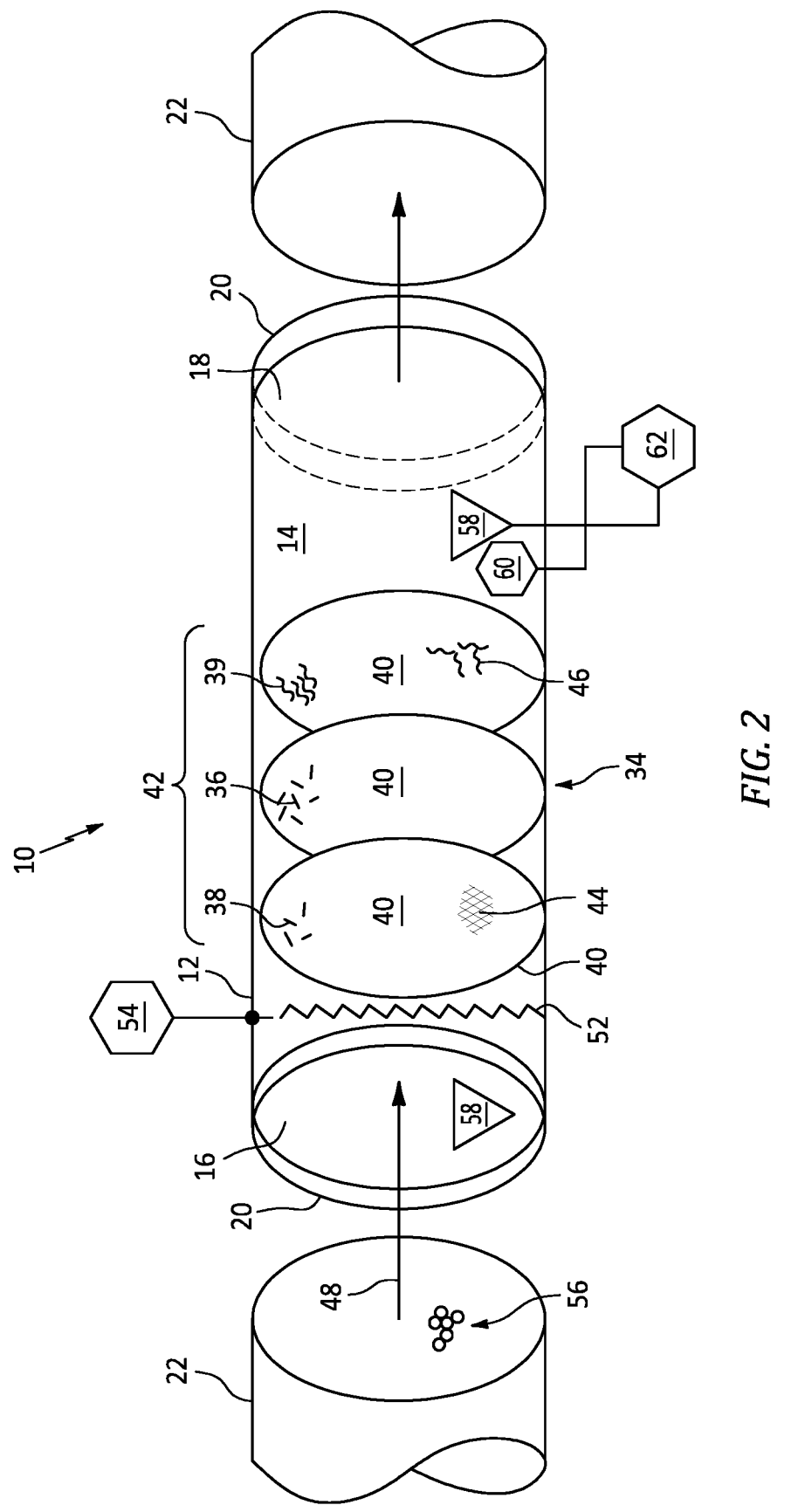
FIG. 2 is a schematic diagram of an exemplary decontamination system.

Referring now to FIG. 1 and FIG. 2, an exemplary decontamination system 10 is shown. The decontamination system 10 includes a reactor enclosure 12 forming a cavity 14. The enclosure 12 includes an inlet 16 and an outlet 18 at opposite ends of the enclosure 12. The reactor enclosure 12 can include coupler fittings 20 proximate the inlet 16 and outlet 18 for coupling and/or decoupling the reactor enclosure to pipe 22 and allow for access to the cavity 16. In an exemplary embodiment the enclosure 12 can be formed as a tubular shape, a rectilinear shape, a spherical shape and the like. The enclosure 12 can be in fluid communication with a bleed air system 24 from a compressor section 26 of a gas turbine engine 28 and a supply 30 to an on-board oxygen generation system 32 for the cabin of an aircraft. In an exemplary embodiment, the enclosure 12 can be upstream from a bleed air heat exchanger 33.

The reactor enclosure 12 can include a bed 34 comprising decontamination materials 36 such as catalysts 38 coated on a substrate 40. The bed 34 can be formed in layers 42. The substrate 40 can include a mesh 44 or a nano fiber support 46 or foam 46 or any combination thereof. The mesh elements 44 or fiber support 46 or foam can be deployed horizontally or radially relative to a direction of air flow 48 within the enclosure 12.

The decontamination material 36 can include catalyst 38, sorbents 39 and the like deposited on an ultra-short-channel-length metal substrate 40. It is understood that any short contact time substrate made of ceramic or metal, such as the MICROLITH® brand substrate 40 can be utilized. The deposition of the decontamination material 36 onto the metal substrate 40 can be implemented by various methods. Alternatively, finished decontamination materials 36 deposited and bound to an ultra-short-channel-length metal substrate 40 from Precision Combustion, Inc., North Haven, Connecticut. The metal substrate 40 is preferably employed in a mesh 44 or fiber support or foam 46 form; but the substrate 40 is not limited to such structures, and other structures may be suitable.

In another embodiment, the decontamination material 36 comprises one or more catalysts and the like, deposited on a MICROLITH® brand ultra-short-channel-length metal mesh 44 substrate 40. The metal mesh 44 is constructed from any conductive metal or combination of metals provided that the resulting structure is capable of withstanding the temperatures and chemical environment to which it is exposed. Suitable non-limiting materials of construction for the metal mesh 44 include iron-chromium alloys, iron-chromium-aluminum alloys, and iron-chromium-nickel alloys. Such metal meshes 44 are available commercially, for example, from Alpha Aesar and Petro Wire & Steel. The MICROLITH® brand substrate 40 can be obtained from Precision Combustion, Inc., noted hereinabove. A description of the technology can be found, for example, in U.S. Pat. No. 5,051,241, incorporated herein by reference. Generally, the design comprises ultra-short-channel-length, low thermal mass metal monoliths that contrast with prior art monoliths having longer channel lengths. For the purposes of this invention, the term "ultra-short-channel-length" refers to channel lengths in a range from about 25 microns (μm) (0.001 inch) to about 500 μm (0.02 inch). Thus, in visual appearance the preferred metal mesh substrate 40 of ultra-short-channel-length looks like a reticulated net or screen. In contrast, the term "long channels" pertaining to prior art monoliths refers to channel lengths greater than about 5 mm (0.20 inch) upwards of 127 mm (5 inches). (Note that the channel length of the substrate is not to be confused with the length of the catalyst bed. The two lengths are different in kind and degree.)

As compared with previously disclosed monolithic substrates, the preferred MICROLITH® brand ultra-short-channel-length metal mesh substrate facilitates packing more active surface area into a smaller volume and provides increased reactive area for a given pressure drop. Whereas in previously disclosed honeycomb monoliths having conventional long channels, a fully developed boundary layer is present over a considerable length of the channels; in contrast, the ultra-short-channel-length characteristic of the preferred catalyst of this invention avoids boundary layer buildup. Since heat and mass transfer coefficients depend on boundary layer thickness, avoiding boundary layer buildup enhances transport properties. The advantages of employing the ultra-short-channel-length metal substrate, and prefer- ably, the MICROLITH® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference.

The ultra-short-channel-length metal substrate 40 employed in this invention can be provided in any configu- ration or structure, provided that the decontamination pro- cess of this invention is operable. One alternative configu- ration comprises a coil (or coiled configuration) in which a sheet of metal mesh 34 is rolled on itself to provide for a radial flow path from an inlet of inner diameter to an outlet of larger outer diameter. Alternatively, the decontamination material 36 can be employed as a sheet or a plurality of metal mesh layers 42 stacked, typically, in an orderly-pile one on the other. In the bed 34, the number of layers advantageously ranges from 2 to about 500 or more. The stack of layers 42 is typically compressed to reduce or minimize void spaces between each layer. In the coiled or stack configuration, the plurality of metal mesh layers 42 provides for a plurality of void spaces in random order. For the purposes of this invention, the term "bed" comprises the entire assembly, e.g., coil or stack, of substrate(s).

More specifically, the MICROLITH® brand metal mesh typically is configured with a plurality of pores having a diameter ranging from about 0.25 millimeters (mm) to about 1.0 mm, with a void space greater than about 60 percent, preferably up to about 80 percent or more. A ratio of channel length to diameter is generally less than about 2:1, prefer- ably less than about 1:1, and more preferably, less than about 0.5:1. Preferably, the ultra-short-channel-length metal mesh 44 has a cell density ranging from about 100 to about 1,000 cells or flow paths per square centimeter. The ultra-short- channel-length metal mesh 44 can be constructed as dis- closed, for example, in U.S. Pat. No. 6,156,444, incorpo- rated herein by reference.

In another embodiment, the one or more layers of metal mesh are replaced by a nano fiber support or porous metal foam 46 comprising a three-dimensional interconnected network of solid struts defining a plurality of pores of an open-cell configuration. The pores can have any shape or diameter; but typically, the number of pores that subtend one inch designate a "pore size," which for most purposes ranges from about 5 to about 40 pores per inch. The relative density of such foams, taken as the density of the foam divided by the density of solid parent material of the struts, typically ranges from about 2 to about 15 percent. Porous metal foams 46 are commercially available in a variety of alloys capable of withstanding the operating temperatures of the decon- tamination process of this invention.

The air 48 can be fluidly coupled with the enclosure 12 through the inlet 16 and discharged out of the enclosure 12 through the outlet 18. The outlet 18 can be fluidly coupled to the on-board oxygen system 32. The inlet 16 can be fluidly coupled to the bleed air 24 of the gas turbine engine 28 compressor section 26 and configured to deliver poten- tially contaminated air 48 to the cavity 14 of the enclosure 12 for contact with the bed 34. The potentially contaminated air 48 can be supplied from the bleed air system 24. Valves 50 can be fluidly coupled to the inlet 16 and/or outlet 18 to control the flow of the air 48. It is contemplated that the present disclosure can be extended to all cabin interiors where the potential exists for contaminated air containing VOC's organophosphates and other breathing air contami- nants, such as with the Navy fleet, military vehicle, public transportation, office space and the like.

In an exemplary embodiment, the substrate 40 can be fluidly coupled to a heater 52 to allow for heating the air 48 entering the bed 34 in order to pre-heat the bed 34. The power to resistively heat the heater 52 can be supplied by power source 54, can be connected to the engine's electrical system during operation.

In another exemplary embodiment, the substrate 40 of metallic mesh 44 or nano fibers 46 or foam 46 can be restively heated to temperatures necessary for proper cata- lyst 38 function.

The decontamination material 36 inside the bed 34 can include catalysts 38 that can decompose contaminants 56. The contaminants 56 can include but are not limited to VOC's; organophosphates; H—C—O compounds; oil con- taminants; engine oils; or hydraulic oils containing tri-cresyl phosphate (TCP); methanol; Aeroshell 560; tri-cresyl phos- phate (the most toxic contaminant); as well as Skydrol LD-4 hydraulic fluid; these substances may include diphenyl ami- nes, tributyl phosphate, dibutylphenylphosphate, butyl diphenyl phosphate, 7-Oxabicyclo [4.1.0]heptane-3-carbox- ylic acid, 2-ethylhexyl ester, and butylated hydroxytoluene and other hydrocarbons and other breathing air contami- nants. In an exemplary embodiment the catalyst materials 38 can include Pt, Pd, or other precious metals and their combination coated directly on the substrate 40 including materials such as alumina, lanthanide, ceria, or other rare earth materials, to increase available surface area for con- tacting the air 48.

The decontamination system 10 can include a variety of sensors to monitor the process gases through the system 10, such as thermal sensors 58 and carbon monoxide/carbon dioxide sensors 60. The thermal sensors 58 can be utilized to control temperature within the cavity 14. Carbon mon- oxide sensor 60 can be utilized to determine end of life for the bed 34. The sensors can be used to detect carbon dioxide and hydrocarbon concentrations flowing through the outlet 18 to determine the composition of the treated air stream. The sensors 58, 60 can be coupled to a controller 62. The controller 62 can be used to detect contaminants 56, as well as by products of the reactions that take place in the bed 34. The controller 62 can be utilized as part of the monitoring function of the system 10 for contamination indication, bed end-of-life, maintenance and the like.

Figure 3:
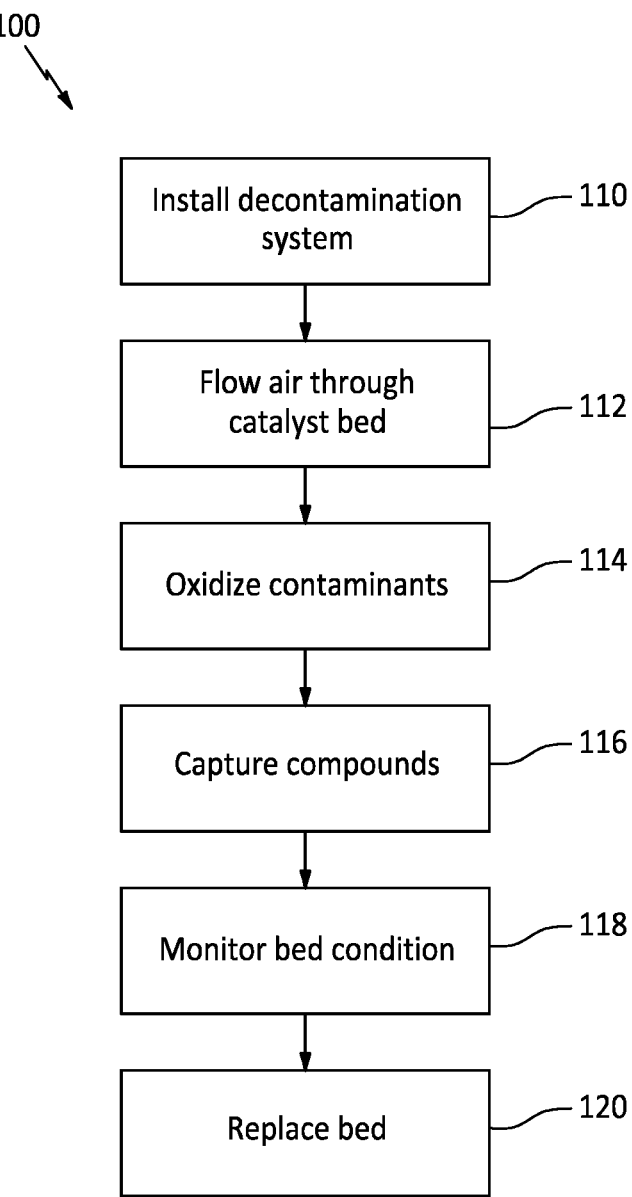
FIG. 3 is a process diagram of an exemplary decontamination process.

Referring to FIG. 3, a process diagram 100 is shown. The decontamination system 10 can be employed in a variety of locations along the bleed air 24 system supply to the on-board oxygen generation system 32. At step 110 the decontamination system 10 is installed by fluidly coupling the enclosure 12 to the bleed air 24 system supply line pipe 22. The inlet 16 and outlet 18 can be fluidly coupled with pipe 22. In an exemplary embodiment, the enclosure 12 can be located proximate to the compressor 26 discharge result- ing in high inlet 16 temperatures, thus avoiding the need for the heater 52, allowing for a passive operation and simpler installation.

At step 112 the air 48 is directed through the bed 34. If needed, the air 48 can be heated prior to contacting the bed 34. Alternatively, if needed, such as if the gas temperature is below the bed optimum operating temperature, the heater 52 can be turned on or the catalytic elements 40 can be resistively heated.

At step 114 the air 48 is contacted with the decontami- nation material 36 and organic contaminants 56 are reacted to form inorganic phosphates, carbon dioxide and water. In an exemplary embodiment, the contaminants 56 are catalytically oxidized to produce a complete combustion reaction. The decontamination system 10 is configured for a destructive adsorption technique to filter the contaminants 56, such as oils, through an exothermic catalytic oxidation reaction where the contaminants 56 are oxidized in the presence of air.

At step 116, the oxidized contaminants of interest 56 in the air are captured on the bed 34. The oxidized contaminants 56 are adsorbed onto the bed 34 during the catalytic oxidation reaction. The inorganic materials, such as phosphates and silicon physically adsorbs onto the surface of the catalyst 38. In an alternative embodiment, sorbents coated onto the substrate 40 could also be used to trap contaminants 56, such as volatile organic materials.

At step 118, the bed 34 can be monitored to determine the condition of the bed 34. There are several techniques that can be utilized to monitor the condition of the bed 34. In an exemplary embodiment, the temperature of the air 48 upstream and downstream of the bed 34 can be sensed to indicate a delta T, (temperature at the inlet 16 vs the temperature at the outlet 18) which correlates to the presence of contaminants 56. In another exemplary embodiment, the presence of tri-cresyl phosphate can be detected at the inlet 16 and outlet 18 using an analytical instrument, such as gas chromatography, to determine if the tri-cresyl phosphate, hydrocarbons, carbon monoxide and H—C—O compounds had been reacted to produce carbon dioxide and water. The indication of a lack of tri-cresyl phosphate peaks in the chromatogram of the outlet stream can indicate a functioning bed 34. In another exemplary embodiment, the carbon dioxide input and output can be monitored. The increase of carbon dioxide in the output confirms that certain contaminants 56 are being destroyed via catalytic oxidation. If smaller chain hydrocarbons (C1s-C3s) are detected, an indication that less than 100% conversion of the longer chain organics and a potential of organo-phosphate, such as tri-cresyl phosphate, carbon monoxide, and volatile organic compounds are bypassing the bed 34. In another exemplary embodiment, detection of carbon monoxide in the outlet 18 by ubiquitous CO sensors can be utilized to indicate the end-of-life of the bed 34. When the bed 34 is functioning and active, the reaction mechanism is based on a complete combustion reaction, producing carbon dioxide. When the bed 34 deactivates, the reaction mechanism shifts toward incomplete combustion, leading to the production of carbon monoxide. A carbon monoxide peak detected at the outlet 18 can indicate the end-of-life of the bed 34.

At step 120, the bed 34 can be replaced with a new bed 34. The modular design of the decontamination system 10 allows for the enclosure 12 to be decoupled via the coupler fittings 20 and changed out.

A technical advantage of the disclosed system can include monitoring contaminants in the air as well as filtering known contaminants prior to entering the OBOGS.

Another technical advantage of the disclosed system can include the capacity to monitor the function of the reactor and notify the user of a contamination event.

Another technical advantage of the disclosed system can include the capacity to alert system controls for indication of a contamination leak on-board and/or end of life for the reactor.

Another technical advantage of the disclosed system can include the capacity to filter air contaminants and reduce the contaminants to carbon dioxide and water which do not damage the OBOGS.

There has been provided a decontamination process and system. While the system and process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A decontamination system for removing bleed air contamination comprising:
   an enclosure defining a cavity;
   an inlet fluidly coupled to said cavity, said inlet configured to receive air into said cavity;
   an outlet fluidly coupled to said cavity, said outlet configured to discharge said air from said cavity;
   a bed located within said cavity fluidly coupled to said inlet and said outlet; said bed comprising a substrate with decontamination materials attached to said substrate;
   a heater within the enclosure, the heater fluidly coupled to said substrate configured to heat said substrate to a predetermined temperature configured to cause reaction of the decontamination materials with contaminants in said bleed air; and
   a gas turbine engine compressor bleed air system fluidly coupled to said inlet and an on-board oxygen generation system fluidly coupled to said outlet.

2. The decontamination system according to claim 1, wherein said decontamination materials are configured to remove said contaminants from said bleed air.

3. The decontamination system according to claim 1, wherein said decontamination materials comprise catalyst materials configured to oxidize said contaminants in said bleed air.

4. The decontamination system according to claim 1, wherein said substrate comprises at least one of a mesh, a foam and a nano fiber support and combinations thereof.

5. The decontamination system according to claim 1, further comprising:
   sorbent materials coupled to said substrate, said sorbent materials coated with functionalities that adsorb said contaminants.

6. The decontamination system according to claim 1, wherein said substrate comprises an ultra-short-channel-length metal substrate.

7. A gas turbine engine equipped with a compressor bleed air decontamination system comprising:
   a bleed air supply line;
   an enclosure defining a cavity;
   an inlet fluidly coupled to said cavity, said inlet configured to receive bleed air into said cavity from a compressor bleed air supply pipe;
   an outlet fluidly coupled to said cavity, said outlet configured to discharge said air from said cavity into on-board oxygen generator system;
   a bed located within said cavity fluidly coupled to said inlet and said outlet; said bed comprising a substrate with decontamination materials attached to said substrate; and
   a heater within the enclosure, the heater fluidly coupled to said substrate configured to heat said substrate to a predetermined temperature configured to cause reaction of the decontamination material with contaminants in said bleed air.

8. The gas turbine engine equipped with a compressor bleed air decontamination system according to claim 7, wherein said decontamination materials comprise catalyst materials configured to oxidize said contaminants in said bleed air.

9. The gas turbine engine equipped with a compressor bleed air decontamination system according to claim 7, wherein said substrate comprises layers of at least one of a mesh, a foam and a nano fiber support and combinations thereof.

10. The gas turbine engine equipped with a compressor bleed air decontamination system according to claim 7, further comprising:

at least one sensor fluidly coupled to said bed, said at least one sensor configured to monitor said bed.

11. The gas turbine engine equipped with a compressor bleed air decontamination system according to claim 7, wherein said substrate comprises an ultra-short-channel-length metal substrate.

\* \* \* \* \*